United States Patent
Kay

(10) Patent No.: US 9,830,202 B1
(45) Date of Patent: Nov. 28, 2017

(54) STORAGE AND PROCESS ISOLATED WEB WIDGETS

(71) Applicant: GOOGLE INC., Mountain View, CA (US)

(72) Inventor: Erik Kay, Belmont, CA (US)

(73) Assignee: Google LLC, Mountain View, CA (US)

( * ) Notice: Subject to any disclaimer, the term of this patent is extended or adjusted under 35 U.S.C. 154(b) by 259 days.

(21) Appl. No.: 14/095,485

(22) Filed: Dec. 3, 2013

Related U.S. Application Data

(60) Provisional application No. 61/815,378, filed on Apr. 24, 2013.

(51) Int. Cl.
  *G06F 3/00* (2006.01)
  *G06F 9/44* (2006.01)
  *G06F 9/46* (2006.01)
  *G06F 13/00* (2006.01)
  *G06F 9/54* (2006.01)

(52) U.S. Cl.
  CPC ..................................... *G06F 9/54* (2013.01)

(58) Field of Classification Search
  None
  See application file for complete search history.

(56) References Cited

U.S. PATENT DOCUMENTS

| | | | | |
|---|---|---|---|---|
| 2008/0184157 A1* | 7/2008 | Selig | ..................... | G06F 17/243 715/781 |
| 2010/0235762 A1* | 9/2010 | Laiho | ................ | G06F 17/30893 715/753 |
| 2010/0242110 A1* | 9/2010 | Louch | ................... | G06F 21/552 726/22 |
| 2010/0281537 A1* | 11/2010 | Wang | ..................... | G06F 9/468 726/22 |
| 2011/0047613 A1* | 2/2011 | Walsh | ................... | G06F 21/566 726/16 |
| 2012/0143752 A1* | 6/2012 | Wong | ................... | G06Q 20/105 705/41 |
| 2012/0158584 A1* | 6/2012 | Behren | ................. | G06Q 20/10 705/41 |

(Continued)

OTHER PUBLICATIONS

Parfeni, Multi-Processes in Browsers: Chrome, Internet Explorer, Firefox and Webkit, Codeaurora, Apr. 2004, 2 pages.*

(Continued)

*Primary Examiner* — Diem Cao
(74) *Attorney, Agent, or Firm* — Brake Hughes Bellermann LLP

(57) ABSTRACT

A content widget is created for an embedder that executes in a renderer process of a computer system. The content widget is configured to execute in a process that is separate from the renderer process and access a first data source that is isolated from the embedder. The content widget is configured to provide a representation of at least a portion of data from the first data source, and receive a selection of a first item corresponding to the representation. In response to receiving the selection, the content widget may retrieve the first item from the first data source, and in response to retrieving the first item, provide the first item to the embedder. The content widget may have one or more permissions that the embedder does not have, or the embedder may have one or more permissions that the content widget does not have.

21 Claims, 6 Drawing Sheets

(56) References Cited

U.S. PATENT DOCUMENTS

| | | | | |
|---|---|---|---|---|
| 2013/0036448 A1* | 2/2013 | Aciicmez | ............ | G06F 21/6218 726/1 |
| 2013/0275272 A1* | 10/2013 | Begin, Jr. | .......... | G06Q 30/0623 705/26.63 |
| 2014/0258972 A1* | 9/2014 | Savage | .................... | G06F 8/30 717/106 |

OTHER PUBLICATIONS

Guabtni, Embedding MindMap As a Service for User-Driven Composition of Web Applications, ACM, 2011, pp. 4 pages.*
Chen et al, App Isolation: Get the Security of Multiple Browsers with Just One, ACM, 2011, 11 pages.*
Bersvendsen et al, Secure access for widgets to resources and privileged APIs, www.w3.org, 2008, 4 pages.*
"Android WebView Example", Feb. 23, 2012, retrieved on Mar. 19, 2013 from www.mkyong.com/android/android-webview-example/, 14 pages.
"Embed Content", Google Chrome, retrieved on Mar. 19, 2013 from developer.chrome.com/dev/apps/app_external.html, 6 pages.
"What is IFrame (Inline Frame)?", WhatIs.com, retrieved on Mar. 19, 2013 from web.archive.org/web/20120523025928/http://whatis.techtarget.com/definition/IFrame-Inline-Frame, 15 pages.
Cronin, "Modal Windows in Modern Web Design", Smashing Magazine, May 27, 2009, retrieved on Mar. 19, 2013 from www.smashingmagazine.com/2009/05/27/modal-windows-in-modern-web-design/, 34 pages.

* cited by examiner

STORAGE AND PROCESS ISOLATED WEB WIDGETS

RELATED APPLICATION

This application claims priority under 35 U.S.C. §119 to Provisional Application No. 61/815,378, filed Apr. 24, 2013, entitled "Storage and Process Isolated Web Widgets," the disclosure of which is incorporated by reference herein in its entirety.

TECHNICAL FIELD

This disclosure generally relates to web applications and web content.

BACKGROUND

Web applications may operate to make a web browser treat certain websites like applications. Yet, users may not want to grant access to web applications display or access personal data such as credit card numbers, all personal contacts, or photos. The users may not want to risk the applications sharing their personal data with others, or risk having their personal data exposed to attacks. Yet, those users may still wish to have access to features of the applications, such as payment options, email or messaging capabilities, or photo editing.

SUMMARY

Web applications include privileged web widgets that can access personal credit card numbers, contacts, photos, or other data, and securely provide a portion of that data to the web application without disrupting the user's experience.

In some implementations, a method includes creating, using a processor of a computer system, a content widget for an embedder that executes in a renderer process of the computer system. The content widget may be configured to: execute in a process that is separate from the renderer process; access a first data source that is isolated from the embedder; provide a representation of at least a portion of data from the first data source; receive a selection of a first item corresponding to the representation; in response to receiving the selection, retrieve the first item from the first data source; and in response to retrieving the first item, provide the first item to the embedder.

Other implementations of this aspect include corresponding systems, apparatus, and computer programs, configured to perform the actions of the methods, encoded on computer storage devices.

One or more of the implementations of the subject matter described herein may provide one or more of the following advantages or features. Privilege separation between embedding applications and widgets may provide increased security, for example, by allowing embedding web pages or applications to embed user interface widgets that have more access to privileged data or other capabilities than the embedding web page could access. These capabilities may be isolated from the embedding web pages or applications, for example at a process level, at a storage level, and at an API level. Examples may include an ad widget that has access to an ad network identifier, a photo gallery widget that allows a user to browse and pick from personal photos to use within the embedding application, or a wallet widget that has the ability to authorize in-application payments on behalf of a user. In various implementations, a system may present a user interface within the context of an embedding application, yet the user interface depends on privileged or potentially dangerous APIs that are not necessarily exposed to the embedding application directly. Thus, a user's data, such as bank account data, contact information, or other data, is protected because the location of storage is isolated and separate from the embedder, even while the data may appear to a user as if it were rendered by the embedder.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
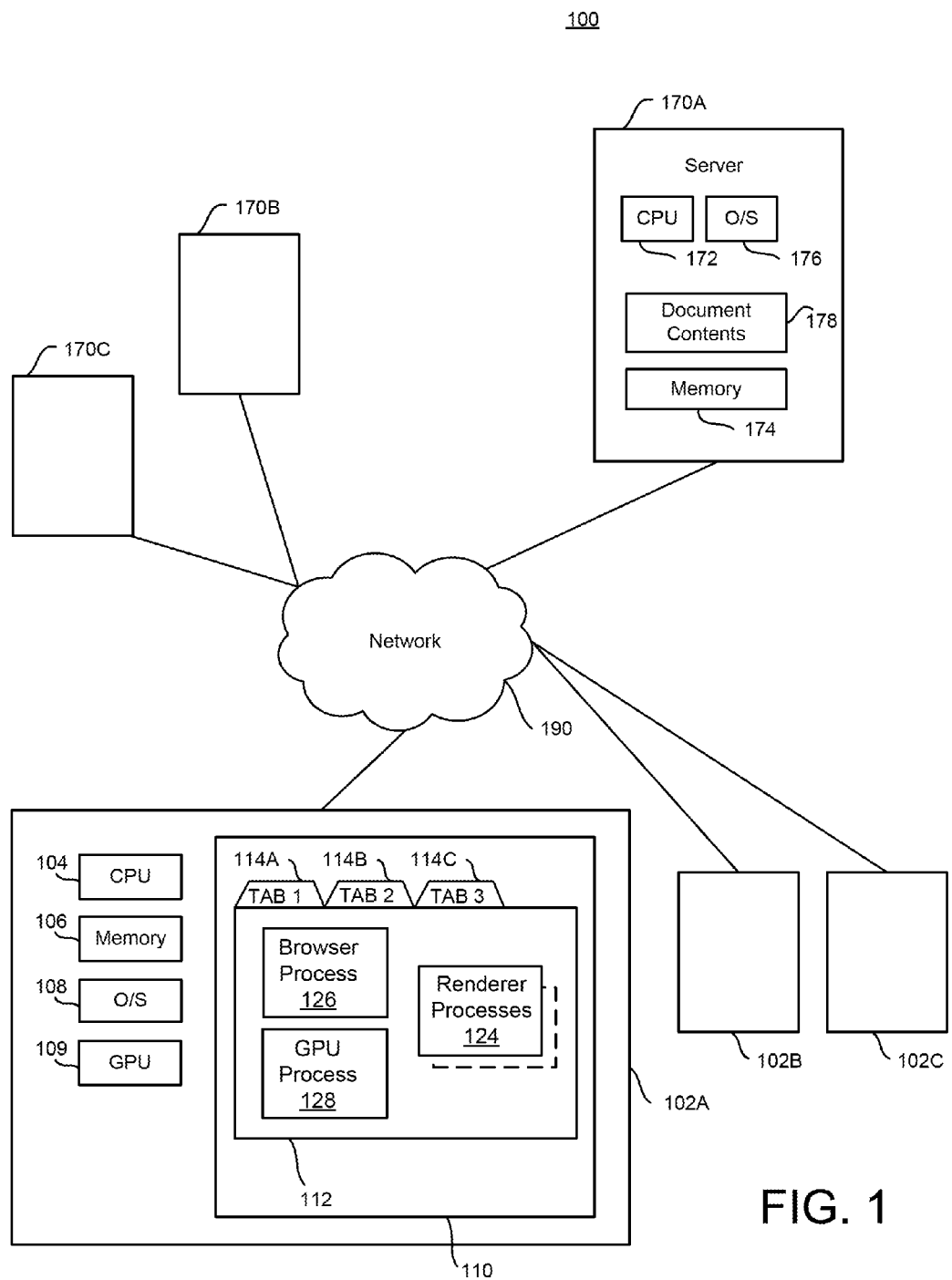
FIG. 1 is a block diagram of a system that can be used to provide content widgets.

Systems and methods described herein provide a communication system that embeds a content widget into another renderer process while still maintaining a sandboxed, multi-processor browser model. Implementations allow the content widget to remain isolated from its embedder process and from other renderer processes. The embedder therefore cannot access storage accessed by the content widget or control the execution of the content widget. Furthermore, in some implementations, the content widget may be executed as a modal layer (e.g., using a modal dialog tag) so the embedder cannot overlay a display over the content widget (for example, to prevent against attacks such as click-jacking). Moreover, communications between the content widget, embedder, and browser occur with no significant changes to the HTML rendering engine used by the browser. An example of such an HTML rendering engine is WebCore, a publicly-available document object model library, or WebKit, a layout engine used, for example, in Safari® and Chrome™.

In some implementations, the content widget process and the embedder process communicate through the browser process. This enables the content widget and embedder to run as independent processes, maintaining the sandbox and other security features, while enabling the embedder to receive and respond to events occurring within the content widget. A sandbox is a security mechanism for separating running processes. A sandboxed process has access to limited resources and generally has restricted or no access to input and output devices. For example, a sandboxed process may have permission to write to and read from specific areas of memory. To accomplish the communication, the embedder process and browser process may use browser plug-in objects to facilitate communications between the embedder and content widget.

In various implementations, an embedder, such as a web page or web application, or embedee, such as a content widget, may have different capabilities or permissions from each other, and these capabilities or permissions may be completely isolated. The permissions or capabilities may include, as examples, access to network resources or to resources associated with a local computer system. As one example, which is discussed in more detail below with respect to FIG. 3, an advertising widget may have access to network capabilities that the embedder does not have, for example to download advertising content and report back advertising behavior. As another example, a video chat widget may have permission to access to a webcam of a local computer system, while the embedder, such as a web application, does not have permission to access the webcam. Other illustrative examples may include access to a user's e-mail contacts from an address book on a device, access to a client printer, or access to a client computer storage device such as a Secure Digital (SD) card. Some other examples include an ability to display a notification on a user's desktop, or the ability to add, read, or modify files such as music or picture files stored on a device or SD card.

Thus, in some cases, an embedee such as a content widget may have a permission to access a resource of a computer system, yet the embedder lacks the permission. In additional or alternative examples, the embedder may have a permission to access a resource of the computer system, yet the embedee lacks the permission. A general privilege separation as provided by this approach may be implemented with a wide variety of capabilities, and such examples are for the sake of illustration only.

A webview tag is a mark-up language element that allows a web page to embed another web page or other document. Embedded web pages may run as an independent process in a sandboxed, multi-process browser. The embedded web page, also known as the content widget or embedee, runs as its own process, with isolated storage, and, therefore, should not be able to communicate directly with the embedder web page and vice versa to maintain the sandbox for each process. The embedder web page may need to send events to the content widget to properly embed and render the content widget within its content. Events represent user-interaction with the document, such as scrolling, mouse clicks, etc.

In various implementations, the web browser may include or be associated with one or more web applications. In this context, a "web application" may be configured to perform a single task or multiple tasks for a user. In such an implementation, the web application may be configured to be executed or interpreted by the web browser. This is compared with the native applications that include machine executable code and are configured to be executed directly by a processor or via the operating system of the client device, whereas, a web application may be incapable of execution or display without the aid of the web browser. Thus, web applications can be run inside a browser with a dedicated user interface, and may provide functionality and an experience that is more rich and interactive than a standalone website but are less cumbersome and monolithic than a desktop application. Examples of web applications include games, photo editors, and video players that are run inside the browser.

Web applications can be "hosted web applications", "installable web applications," or "packaged web applications." Hosted web applications may include at least a portion of a web site that itself includes web pages, plus some metadata that may be especially pertinent to the web application or to the user of the web application to allow the web application to perform some particular functionality for the user.

Installable web applications are a way of making a browser treat certain websites like applications. Many installable web applications are hosted web applications with extra metadata (such as a small manifest file that describes the application). Packaged web applications are a type of installable web application. Packaged applications can be thought of as web applications whose code is bundled, so that the user can download all of the content of the web application for execution by the browser. A packaged web application may not need to have network access to perform its functionality for the user, and rather may be executed successfully by the browser locally on the computing device without access to a network. Packaged web applications have the option of using extension application programming interfaces (APIs), allowing packaged applications to change the way the browser behaves or looks.

FIG. 1 is a block diagram of an example implementation of a system 100 that may provide content widgets. In various implementations, the system 100 may include client computing devices 102A, 102B, 102C (such as desktop computers, notebook computers, netbook computers, tablet computers, smart-phones, televisions with at least one processor, etc.). Examples of computing devices are described in more detail below with respect to FIG. 6. A client computing device 102A can include one or more processors (CPU) 104 and one or more memories 106. The client computing device 102A can execute an operating system (O/S) 108 and various applications (110) which may display a user interface window (e.g., web browser 112). Some client computing devices 102A may include a graphics processing unit (GPU) 109 to speed up the rendering of graphics on a display device.

In one implementation, the client computing device 102A may be running or causing the operating system 108 to execute application 110 or web browser 112. In various implementations, this web browser 112 may include a plurality of panes, windows, or tabs 114A, 114B, 114C. The web browser 112 can be a visual area, for example rectangular, containing some kind of user interface. In a graphical user interface (GUI) used in the client computing device 102A, the web browser 112 can be a two-dimensional object arranged on a plane of the GUI known as the desktop. The web browser 112 can include other graphical objects outside of a web page or working area, for example, that may be called the "chrome" of the web browser, e.g., a menu-bar, toolbars, controls, or icons. The web browser may also include a working area in which a document, image, folder contents, or other main object can be displayed. The working area may generally hold one main object (i.e., in a single document interface) or more than one main object in a multiple document interface, such as a webview tag or related construct. In some applications, specifically web browsers or browser applications, multiple documents can be displayed in individual tabs 114A, 114B, 114C. In some implementations, these tabs 114A, 114B, 114C are typically displayed one at a time, and are selectable via a tab-bar which often resides above the contents of an individual window. That is, one selected tab 114A is "forward-facing" and displays information or content to a user in the web browser 112, with the content of other tabs 114B, 114C is "hidden." In some implementations one or more of tabs 114A, 114B, and 114C may include an embedded web page or other document object. The tabs 114A, 114B, and 114C may execute in separate renderer processes 124, each with its own individual memory. In some implementations, one or more of tabs 114A, 114B, and 114C may be browser applications that look and feel like a window for a native application rather than a tab within the browser window.

For example, in various implementations, the web browser 112 may include or be associated with one or more processes, such as browser process 126 and one or more renderer processes 124. A renderer process 124 is a process where web content is parsed, rendered, and where code, such as JAVASCRIPT, is executed. The browser process 126 may be the main process of the browser application and may include a user interface (UI) thread that receives and provides information for user-interaction with the browser tabs 114A, 114B, and 114C. The UI thread may also control all information output to the browser tabs 114A, 114B, and 114C. For example, the browser process 126 may receive events from tabs 114A, 114B, 114C, such as mouse clicks, touches, swipes, resizes, text entry, etc., and may render the graphical information displayed to the user in tabs 114A, 114B, and 114C. The browser process 126 may also have an input-output (I/O) thread for sending messages to and receiving messages from renderer processes 124. Some implementations with a GPU 109 may also include a GPU process 128 that works with browser process 126 to render browser tabs 114A, 114B, and 114C from information generated by browser processes 126.

Each tab 114A, 114B, and 114C may have a corresponding renderer process 124. For example, tab 114A may have a first renderer process 124, tab 114B may have a second renderer process 124 and tab 114C may have a third renderer process 124. Renderer processes 124 may have an I/O thread for sending messages to and receiving messages from the browser process 126. Renderer processes 124 may also have a main thread for handling events and painting and, in some implementations, a compositor thread that works with the GPU process 128 to render information into tabs 114. In some implementations, browser 112 may sandbox renderer processes 124, so that renderer processes 124 cannot access the resources of computing device 102A, directly communicate with each other or with external servers, such as external server 170A, or access the resources of other renderer processes 124. Instead, the browser process 126 may control access to local resources and external servers for browser 112.

The client computing devices 102A, 102B, 102C may receive content from one or more remote servers 170A, 170B, 170C, that may be connected to the client computing devices 102A, 102B, 102C through a network 190. Via the network 190, the computing devices 102A, 102B, 102C may communicate with the remote servers 170A, 170B, and 170C. Network 190 may be any computer network including an intranet or the Internet, as examples.

As shown in FIG. 1, the system 100 can also include one or more remote servers 170A, 170B, 170C, that include one or more processors 172, one or more memories 174, an operating system 176, and one or more documents 178. Documents 178 may be web pages, word-processing documents, PDFs, spreadsheets, text files, pictures, source code, or any other content offered for viewing by third parties over the network 190.

Figure 2:
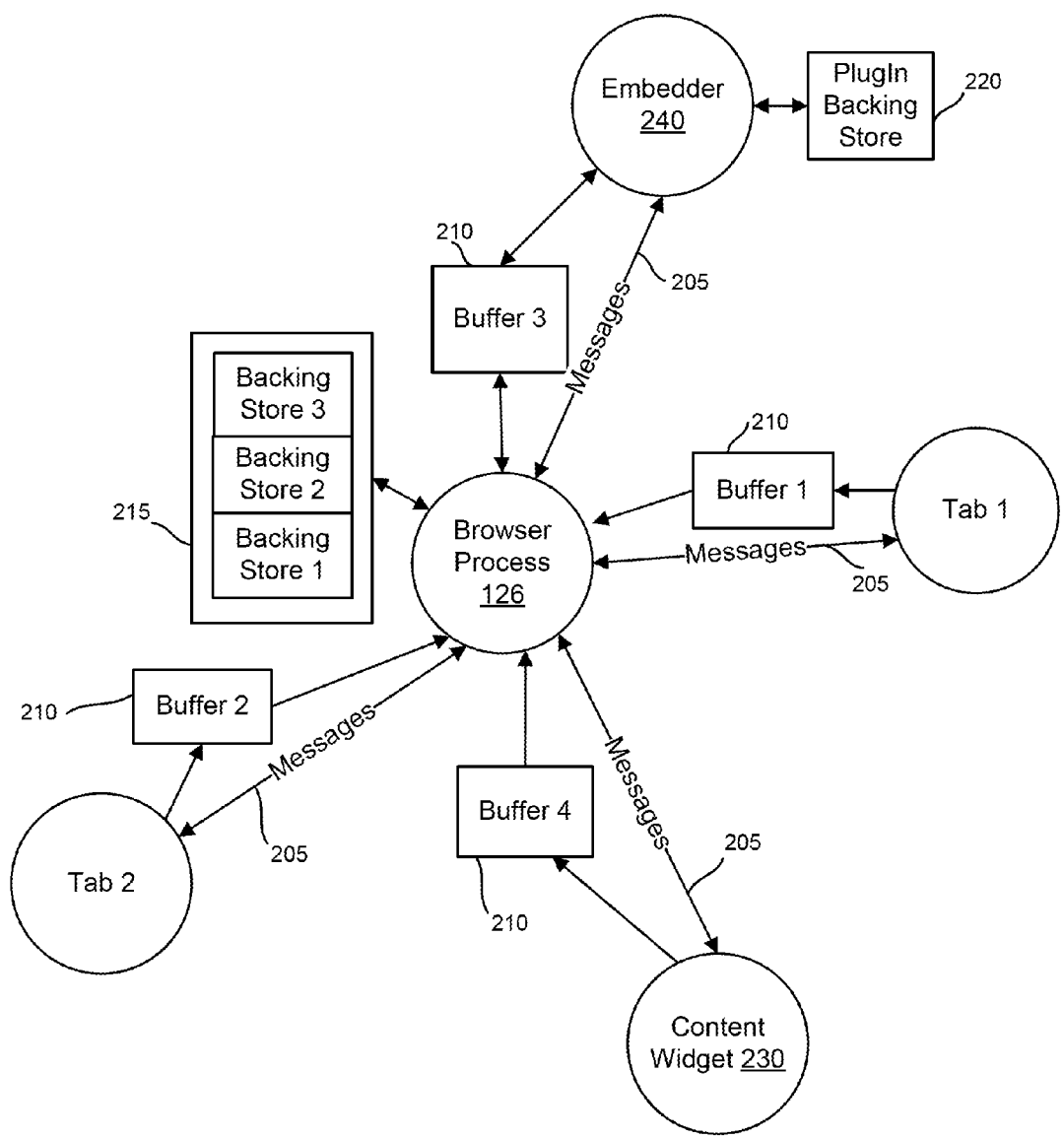
FIG. 2 is an architecture diagram of processes in a multi-process browser.

FIG. 2 is an architecture diagram of processes in a multi-process browser, including one content widget 230 process and one embedder 240 process. The embedder 240 is a web page or web application that may contain a browser add-on activated by a webview tag, or some similar construct. For example, the embedder 240 may include a webview tag in its source Hyper-Text Markup Language (HTML). A webview tag may be a web component that uses a shadow document object model (DOM) that contains a browser add-on. Thus, the webview tag may represent any construct that allows one web page or other document to be embedded in the window or tab of another web page.

As previously mentioned, renderer processes may correspond with a tab, window, or pane shown in the browser window. For example, Renderer processes 1, 2, and 3 may correspond to tabs 114A, 114B, and 114C of FIG. 1, respectively. The embedder 240 may be associated with the content widget 230. Thus, the document contents displayed by the content widget process may appear in tab 114C of FIG. 1, along with the contents of the embedder 240's renderer process. For example, tab 114C of FIG. 1 may include the web page www.example.com that embeds a window for www.embeddedobject.org. The embedded document, also known as the content widget, may run as a separate process, and may not have any indication that it has the role of a content widget.

Renderer processes may communicate with the browser process 126 by sending and receiving messages over communication channel 205, such as, for example, an inter-process communication (IPC) channel. In some implementations, when an event that is triggered from the content widget window, for example as a result of user interaction within the content widget window, the browser process may communicate the event to the embedder process using messages over channel 205. The embedder process may determine that the event was meant for a content widget 230 and the embedder process may therefore notify the browser process, via, for example, channel 205. The browser process may send the event to the content widget 230, where the event is handled. The content widget 230 may also return an acknowledgement to the browser process, and the browser process may notify the embedder process of the acknowledgement. In some implementations, for example those using asynchronous events, if the browser process does not receive the acknowledgement after a predetermined amount of time the browser process sends an event to the embedder process to indicate that the content widget is unresponsive. If the content widget process sends an acknowledgement after the predetermined amount of time, the browser process may send another event to the embedder to indicate that the content widget is responsive again. In some implementations, for example those using synchronous events, while the content widget handles the event the embedder process may be blocked and may not be allowed to forward any other messages to the content widget. In such implementations, the browser process may unblock the embedder process if the content widget process is unresponsive for a predetermined period of time.

Painting refers to rendering content area on a display device. To paint, or render, content within a tab, pane, or window, a browser may use software assisted rendering or hardware software assisted rendering. Software assisted rendering may be used on any machine, but is slower than hardware assisted rendering. Hardware assisted rendering is faster, but requires a dedicated graphics processing unit, such as GPU 102. In software assisted rendering, a special area of memory 210, also referred to as a shared memory buffer, may be used to communicate painting information from a renderer process to the browser process. In some implementations, the painting information may be images. Alternatively, the painting information may include other drawing information. The painting information may be an entire frame worth of pixels or the painting information may be only the changed pixel regions. The painting information may also include scroll information indicating the number of pixels that are copied over on scrolling. The browser process may use the shared memory buffer to render the appropriate content area on the display device. When a renderer process desires to make a change to the information in the display, for example as part of handling an event, the renderer process may write to the memory buffer it shares with the browser process, notify the browser process that there is data to be painted, and then the browser process may read from the shared memory buffer to draw the tab. For example, in FIG. 2 if Tab 1 renderer process is handling a resize event, the Tab 1 renderer process may write information to Buffer 1 and the browser process 126 may read the information from Buffer 1 to render the content area. In order to refresh a page quickly, the browser process may keep a copy of each shared memory buffer in a backing store 215. The backing store 215 may also reside in a memory of the computing device. For example, when the browser process reads the information from Buffer 1, it may also copy the information into backing store 1. The backing store 215 may allow the browser process 126 to re-draw a particular content area quickly, with the last known information for the renderer process, without having to wait for a renderer process to completely render its display information. While the browser process 126 may read and write to the backing store 215, renderer processes may not have access to the backing store 215.

To paint the content generated by an embedder process, the embedder includes the display information from a content widget because the content widget may be displayed as part of the embedder's content area or frame, such as a tab or window. In other words, the images for the content widget process may be displayed to the user in the content area associated with the embedder process. But because of sandboxing, the embedder process cannot access the shared memory buffer of the content widget to obtain this information. For example, the embedder 240 of FIG. 1 cannot access the Buffer "4" 210. To allow an embedder access to the information it needs to render the content widget, in some implementations, the browser process may share the contents of the shared memory buffer from the content widget with the embedder process. For example, the browser may copy the contents of Buffer 4 to Buffer 3. The add-on backing store may store the contents of the content widget process shared memory buffer at a point in time. This information may be given to the browser process from the content widget, and then copied by the browser process to the memory buffer shared with the embedder, such as Buffer 3 in FIG. 2. In order to include the display information from the content widget process, in some implementations, the embedder process may include a add-on backing store 220 for the content widget. The embedder may copy the information from its shared memory buffer into the add-on backing store 220. The add-on backing store 220 allows the embedder to use the information from the content widget to render its complete content area in the buffer 210 the embedder shares with the browser process, such as Buffer 3 of FIG. 2. The embedder process may read this information and copy it to the add-on backing store 220 that only the embedder process has access to. The browser process may then use Buffer 3 to render the embedder content area or frame, which will include the information from the content widget process.

For hardware assisted rendering, a graphics processing unit (GPU) process receives rendering messages from the renderer processes directly and may create a texture map in a special memory location that contains the visual contents, or image, of the content area for the display. Display information for one particular point-in-time may be referred to as a frame. However, if a content widget renders a frame, the GPU process needs additional information from the embedder to render the complete content area (e.g., tab or window). To obtain this information, the GPU process may send a token that identifies the texture map to the embedder. In some implementations the message may be sent on a special compositor thread to enhance performance. The texture map may have the information from the content widget, and the embedder may add information to the texture map, so that the texture map contains the information to render the embedder and its content widget to the display. For example, the embedder may combine the image from the content widget with its image to produce a new image, or texture, in the texture map. When the embedder is finished, the GPU process may then use the texture map to render the image on the display device.

The lifetime of the content widget may, in some implementations, be controlled by the embedder process, the browser process, or both. Browser process control ensures the content widget process does not cause the embedder process to hang or crash. When a content widget process hangs, the browser process may kill the content widget and notify its embedder. In some implementations, when a content widget is killed or dies, the embedder process may generate a message that indicates the content widget is unavailable or the embedder process may choose to spawn a new content widget process. In some implementations, the embedder process may also hide the content widget process when the embedder's content area is hidden and cause the browser to kill the content widget process if the embedder navigates away from the page that contains the embedded content widget.

In some implementations, for example in cases where the content widget 230 is implemented as a modal layer, the embedder 240 is restricted from overlaying any content over the content widget 230.

Figure 3:
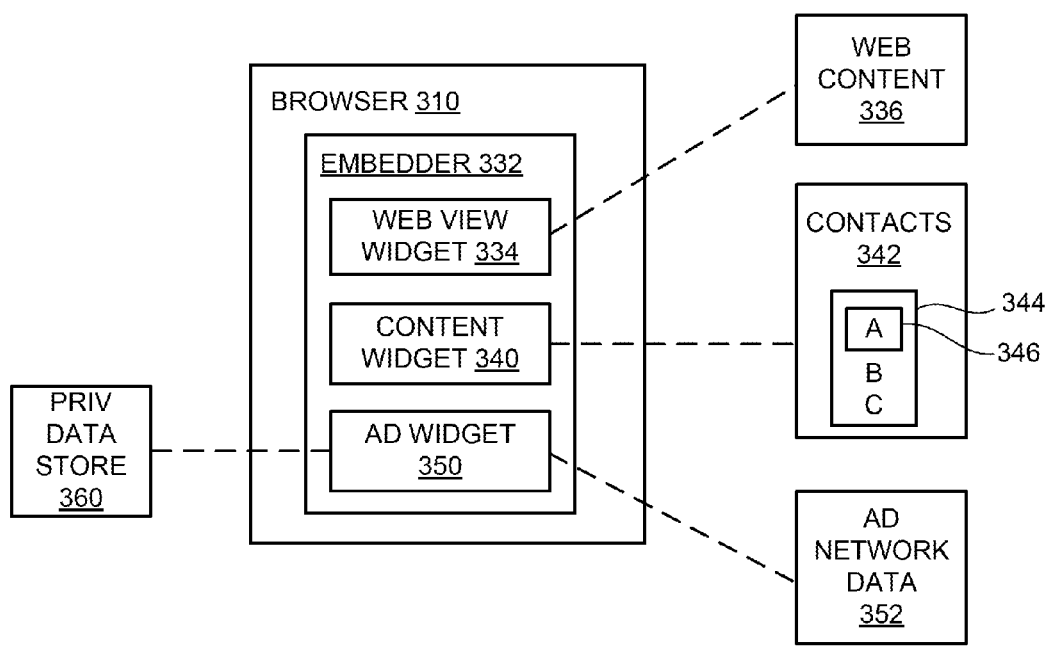
FIG. 3 is a sequence diagram illustrating an example of a system implementing content widgets.

FIG. 3 is a diagram of a system that may be used to implement content widgets. As shown in FIG. 3, a browser 310 may include at least one embedder 332, which may be a web application. The embedder 332 may be associated with various widgets that include self-contained user interfaces and that operate in independent isolated processes. The widgets may access one or more origins. For example, the embedder 332 may be associated with a web view widget 334, which may operate in a process that is isolated from the embedder 332. The web view widget 334 may access and display web content 336. Web content 336 may include live web content. The embedder 332 may also be associated with a content widget 340, which may operate in a process that is isolated from the embedder 332. In various implementations, the embedder 332 and the content widget 340 may have one or more permissions or capabilities that the other does not have. For example, the content widget 340 may have access to capabilities that the embedder 332 does not have, for example enabling the content widget 340 to access a user's contacts.

In some implementations, the content widget may executed as a modal layer (e.g., using a modal dialog tag) so the embedder 332 cannot overlay a display over the content widget 340. The content widget 340 may access and display contacts 342 including, as an example a list of contacts 344 "A, B, C." When contacts 344 are displayed in a window of browser 330, even if displayed within a window associated with embedder 332, the embedder 332 may be restricted from accessing, reading, deleting, or storing the contacts 344. In such a way, the privacy of a user's contacts may be protected from the embedder 332, even if the embedder is later attacked. If a user selects contact 346 "A", for example, the content widget 340 may provide the contact 346 to the embedder 332, for example via the browser 310, as described in more detail below. In such a way, the embedder 332 (using content widget 340) may allow a user to share a web page with a contact, or initiate a phone call, without requiring the user to grant the embedder 332 access to all of the user's contacts 342. In such an example, the embedder 332 would not have permission to access all of the user's contacts 342, yet the content widget 340 may have such a permission. In the example shown in FIG. 3, the user may still be able to view all of the user's contacts 342 using the content widget 340, within what appears to the user as a single web page, yet without the embedder 332 accessing the contacts 342, and without the embedder 332 having permission or capability to access the contacts 342.

In some implementations, the embedder 332 may be associated with an ad widget 350 that provides advertising, such as personalized web page recommendations or coupons, in instances where users have consented to such advertising. In some examples, the ad widget 350 may have permissions or capabilities that the embedder does not have, or vice versa. For example, the ad widget 350 may have access to network capabilities that the embedder 332 does not have, for example to download advertising content and report back advertising behavior, as discussed in more detail below.

The ad widget 350 may access ad network data 352, for example to personalize advertising in instances where users have consented to personalization. Unique identifiers or other data used to personalize such advertising may be stored locally or remotely from where the browser 310 is operating. The ad widget 350 may provide the unique identifiers (which may be stored as a portion of the ad network data 352) to the embedder 332, via the browser 330, as described in more detail below. The ad widget 350 may provide the identifiers or other data to the embedder 332 without giving the embedder 332 access to all of the ad network data 352. In some implementations, the ad widget 350 may also store a portion of the ad network data 352 in a privileged data store 360. In some implementations, the embedder 332 may not have access to the privileged data store 360.

As another example, the embedder 332 may be associated with a wallet widget (not shown) that has the ability to authorize in-application payments on behalf of a user. In such an example, the embedder 332 may not have access to user wallet information (e.g., credit card numbers, bank account number, or other financial information or user data), yet the wallet widget may allow a user to authorize in-application payments while using the embedder 332. As yet another example, the embedder 332 may be associated with a photo gallery widget (not shown) that allows a user to browse and pick from personal photos to use within the embedder 332.

The widgets (e.g., widget 334, 340, or 350) may be isolated on an origin-by-origin basis. In such a way, an exploit in an associated embedder (e.g., embedder 332) cannot access the origin associated with the widget. Thus, a user's data, such as bank account data, contact information, or other data, is protected because the location of storage is isolated and separate from the embedder 332, even while the data may appear to a user, in some implementations, as if it were rendered by the embedder.

Figure 4:
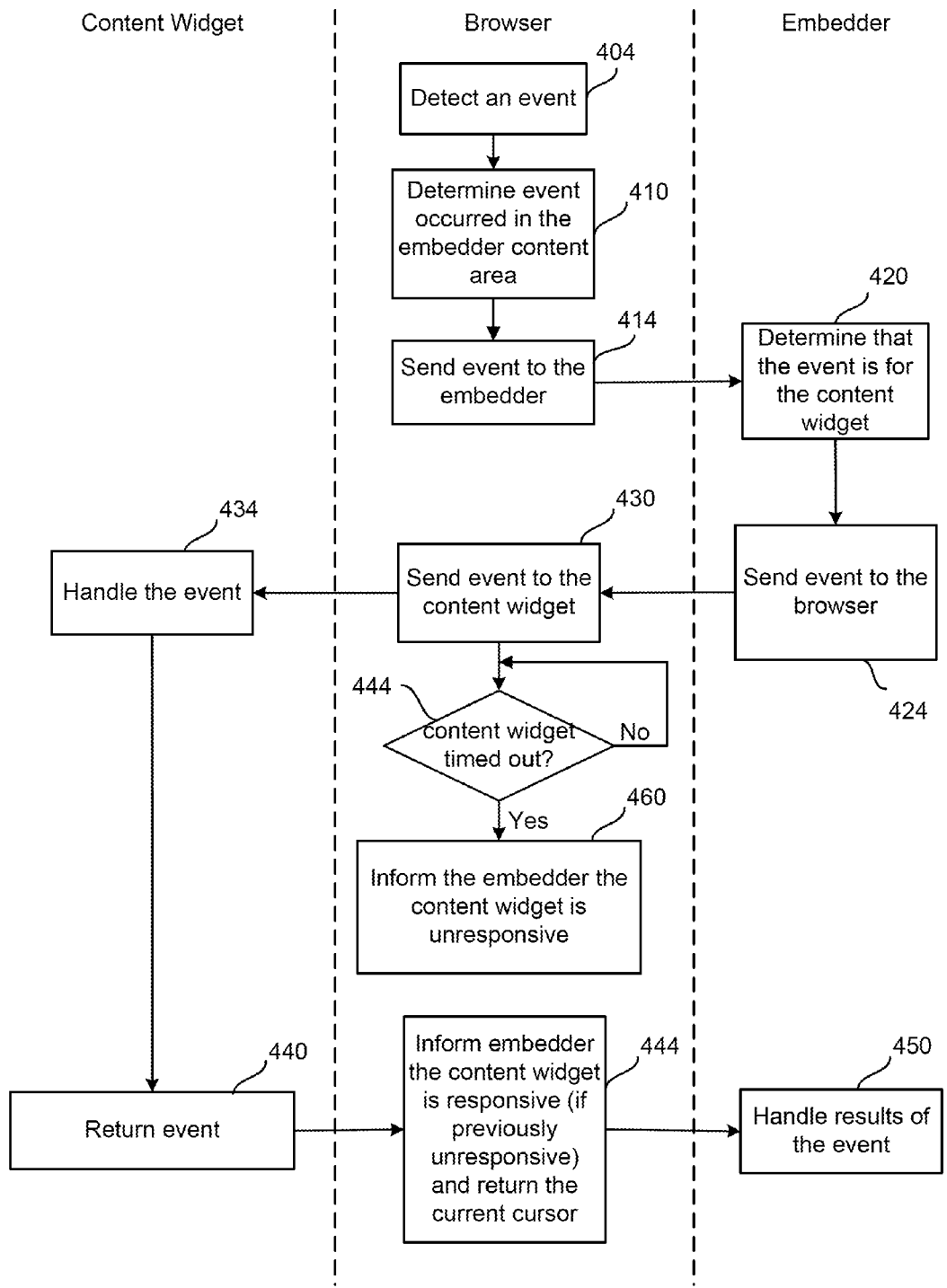
FIG. 4 is a flowchart of a process for handling an event that occurs in a content widget window of a multi-process, sandboxed browser.

FIG. 4 is a flowchart of a process for handling an event that occurs in a content widget window of a multi-process, sandboxed browser. The process demonstrates how the browser process may act as an intermediary for communication between a content widget process and an embedder process. In a multi-process browser, events may occur on the UI thread, so the browser process receives the event first (404). When the browser detects the event, it may forward the event to the renderer process that corresponds to the content area or frame the event occurred in. Because the embedder process corresponds with the frame that receives events for the content widget process, the browser determines that the event occurred in the embedder's content area (410) and sends the event to the embedder process (414). The embedder process may determine that the event is actually destined for the content widget process (420). For example, the embedder process may determine that the event is destined for the content widget process based on where in the screen the event happened or what object the event is associated with.

Once the embedder process has determined that the event is destined for the content widget, it may send a message to the browser process that tells the browser process the event is to be handled by the content widget process (424). In some implementations, for example, those using synchronous events, the embedder process may be blocked from handling further messages until receiving a response from the browser process. In other implementations, for example those using asynchronous events, the embedder process is not blocked. The browser process may forward the event to the content widget process (430). The browser process may use normal communication channels to forward the event to the content widget process. The content widget process may receive the event and proceed to handle the event (434). Handling the event depends on the type of event, such as the type of mouse click, drag, text entry, etc. For example, in some implementations such as those described above with respect to FIG. 3, handling the event may include displaying a set of contacts from remote storage or from a local storage of a client computer, receiving a selection of one of the contacts, and retrieving the selected contact. In some implementations, handling the event may include displaying options to select one or more photos or other files from local or remote storage, and retrieving the photo. As another example, handling the event may include retrieving ad network data associated with a user, in instances where the user has consented to the use of such data. Example implementations of how the content widget may handle the event are described in more detail below with respect to FIG. 5.

When the content widget process has finished handling the event, the content widget process may return the event to the browser process (e.g., provide a contact or photo to the browser process, or send an acknowledgment that the event was handled) (440). In some implementations, process 400 ends because the embedder does not need to know that the content widget handled the event. In some implementations, the browser process may return the current cursor to the embedder process (444). The embedder may then handle the results of the event (450). For example, the embedder may update the information displayed in the tab or window. In one example, the embedder may be a photo editing web application, and the content widget may retrieve a photo from a user's local computer, so that the user can edit the photo using the web application, without granting the web application access to all of the user's photos or other local storage.

Returning to step 430, after sending the event to the content widget the browser process may start a timer to determine whether a predetermined amount of time has passed since the browser process forwarded the event (444). If the predetermined amount of time elapses before the browser process receives the acknowledgment from the content widget process (444, Yes), the content widget process may be considered hung, or timed out. If the content widget process times out, the browser process may consider it crashed and kill the content widget process, unblock the embedder process if blocked, and inform the embedder process about the crash (460), as described above. Using the browser process to time the content widget process enables the embedder process to keep running even if its content widget crashes.

Figure 5:
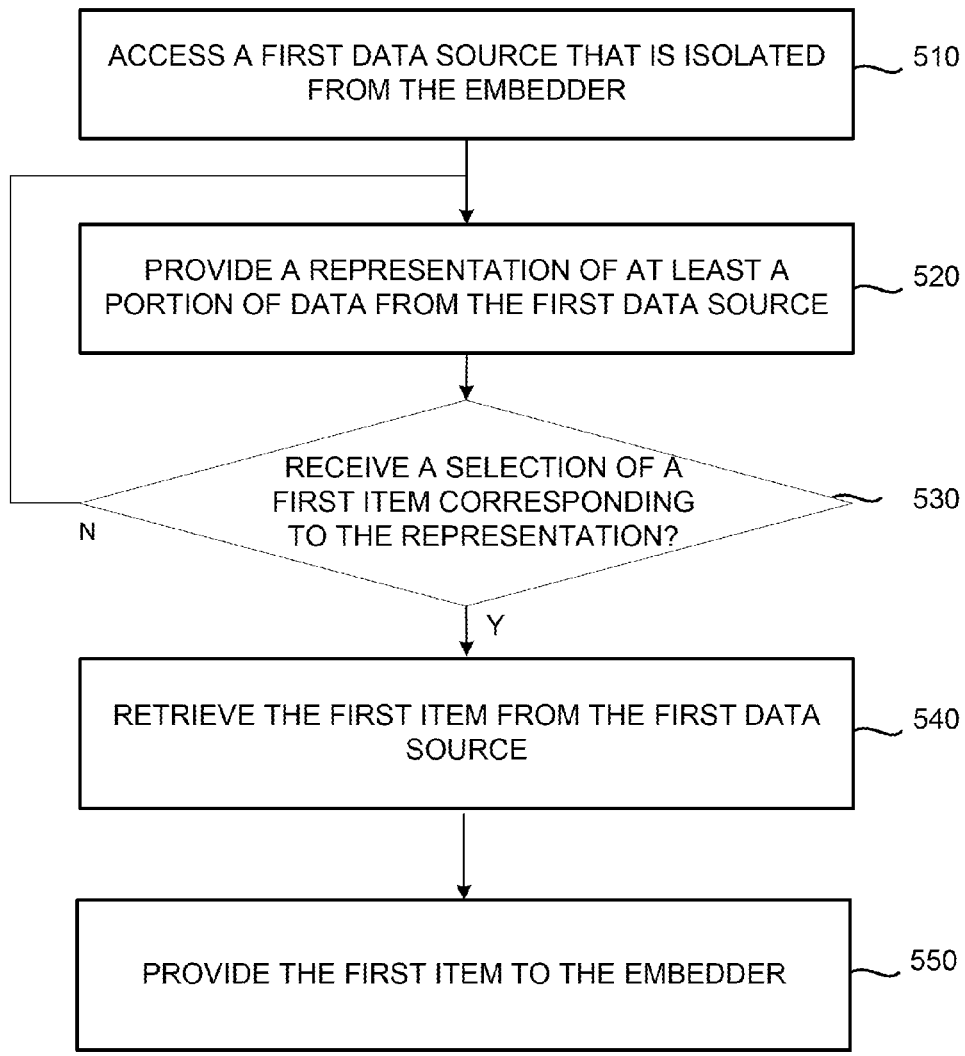
FIG. 5 is a flowchart of a content widget process.

FIG. 5 is a flowchart of a content widget process. As an example, the process shown in FIG. 5 may occur as part of step 434 of FIG. 4. The content widget process may access a first data source that is isolated from the embedder (510). For example, the first data source may be a local disk drive, a remote server, or other data source. The content widget process may proceed to provide a representation of at least a portion of data from the first data source (520). For example, the representation may include a list of contacts, files, photos, etc. The content widget process may determine if it receives a selection of a first item corresponding to the representation (520). For example, the content widget process may determine that it receives a mouse click on a particular file from a user's hard drive. If not, (530, N) the content widget process may continue to provide the representation, or may timeout (not shown) and cease providing the representation. If so (530, Y), the content widget process may retrieve the first item from the first data source (540). The content widget process may provide the first item to the embedder (550). In some implementations, for example as discussed above with respect to FIG. 4, this is done by providing the first item to the browser process, which in turn provides the item to the embedder process. The embedder process may then use the retrieved item for example to display the item in a content window.

Figure 6:
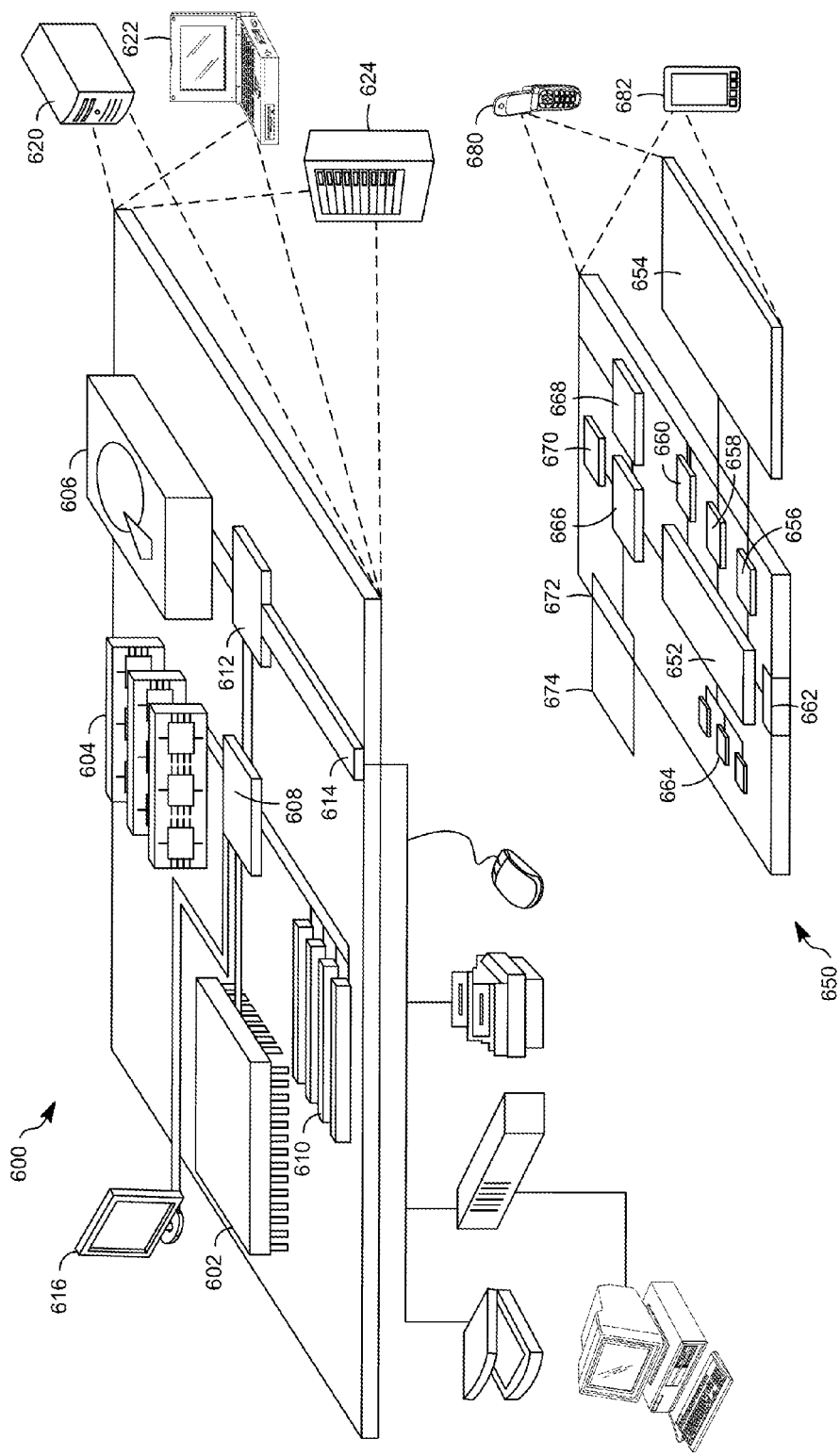
FIG. 6 illustrates an example of a computing device and a mobile computing device that can be used to implement the techniques described here.

FIG. 6 illustrates an example of a computing device and a mobile computing device that can be used to implement the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be examples only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. In some implementations, the memory includes a combination of volatile and non-volatile memory units, for example as described above with respect to FIG. 3. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is illustrative only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, BLUETOOTH, ETHERNET, wireless ETHERNET) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provided as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, which may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a BLUETOOTH, WIFI, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated from the described flows, and other components may be added to, or removed from, the described systems. Accordingly, other embodiments are within the scope of the following claims.

What is claimed is:

1. A method comprising:
    creating, using a processor of a computer system, a content widget for an embedder that executes in a renderer process of the computer system, the content widget including a self-contained user interface and an associated origin for the content widget that is isolated from, and inaccessible to, the embedder and the renderer process, the content widget being configured to,
        execute in a process that is separate from the renderer process, the separate process enabling the embedder to continue executing when the content widget causes an error;
        access a first data source that is isolated from the embedder, the first data source including privileged content accessed using at least one application programming interface to retrieve the privileged content, the privileged content being isolated from, and inaccessible to the embedder;
        provide a representation of at least a portion of data from the first data source;
        receive a selection of a first item corresponding to the representation;
        in response to receiving the selection, retrieve the first item from the first data source; and
        in response to retrieving the first item, provide the first item to the embedder.

2. The method of claim 1, wherein the first data source is a database of a client computer associated with a user of the embedder.

3. The method of claim 1, wherein the first data source is a portion of a database of a remote server, the portion being associated with a user of the embedder.

4. The method of claim 1, wherein the embedder is a web application that includes a manifest file and at least a portion of a website.

5. The method of claim 1, wherein the content widget is configured to provide the first item to the embedder via a web browser process.

6. The method of claim 1, wherein the content widget is further configured to provide the representation in response to receiving an input from a user.

7. The method of claim 1, wherein the first item is at least one of a unique identifier, an image file, a contact, or a credit card number.

8. The method of claim 1, wherein the content widget is configured to execute as a modal window.

9. The method of claim 8, wherein the embedder is restricted from modifying the content widget or from placing content over the content widget.

10. A system comprising:
    a display device;
    at least one processor; and
    a memory that stores instructions that, when executed by the at least one processor, cause the system to perform operations of:
        running a browser process, the browser process generating data used to display a window on the display device, and
        running renderer processes being controlled by the browser process, including an embedder process that has an associated content widget process corresponding to a content widget that includes a self-contained user interface and an associated origin for the content widget that is isolated from, and inaccessible to, the embedder process and the renderer processes, and,
        wherein the renderer processes have storage isolation with respect to each other and each renderer process, each renderer process being provided access to privileged content by using at least one application programming interface to retrieve and provide the privileged content in a content area in the window, the privileged content being isolated from, and inaccessible to the embedder process,
        wherein the browser process acts as an intermediary for communications between the content widget process and the embedder process, and wherein the content widget process:
            executes in a process that is separate from the renderer processes to enable the embedder process to continue executing when the content widget causes an error;
            accesses a first data source that is isolated from the embedder process,
            provides a representation of at least a portion of data from the first data source,
            receives a selection of a first item corresponding to the representation,
            in response to receiving the selection, retrieves the first item from the first data source, and
            in response to retrieving the first item, provides the first item to the browser process for display via the embedder process.

11. The system of claim 10, wherein the content widget provides the representation in response to receiving an input from a user.

12. The system of claim 10, wherein the first item is at least one of a unique identifier, an image file, or a credit card number.

13. The system of claim 10, wherein the content widget process is configured to be displayed as a modal window in the window.

14. The system of claim 13, wherein the embedder process is restricted from placing content over the modal window.

15. A non-transitory computer readable medium containing instructions that, when executed by a processor of a computer system, cause the computer system to:
    create, using a processor of a computer system, a content widget for an embedder that executes in a renderer process of the computer system, the content widget including a self-contained user interface and an associated origin for the content widget that is isolated from, and inaccessible to, the embedder and the renderer process, the content widget being configured to,
execute in a process that is separate from the renderer process, the separate process enabling the embedder to continue executing when the content widget causes an error;
access a first data source that is isolated from the embedder, the first data source including privileged content accessed using at least one application programming interface to retrieve the privileged content, the privileged content being isolated from, and inaccessible to the embedder;
provide a representation of at least a portion of data from the first data source;
receive a selection of a first item corresponding to the representation;
in response to receiving the selection, retrieve the first item from the first data source; and
in response to retrieving the first item, provide the first item to the embedder.

16. The non-transitory computer readable medium of claim 15, wherein the embedder is a web application that includes a manifest file and at least a portion of a website.

17. The non-transitory computer readable medium of claim 15, wherein the content widget is configured to provide the first item to the embedder via a web browser process.

18. The non-transitory computer readable medium of claim 15, wherein the content widget has a permission to access a resource of the computer system.

19. The non-transitory computer readable medium of claim 18, wherein the embedder lacks the permission.

20. The non-transitory computer readable medium of claim 19, wherein the embedder has a second permission to access a second resource of the computer system.

21. The non-transitory computer readable medium of claim 20, wherein the content widget lacks the second permission.

* * * * *